(12) United States Patent
Lee et al.

(10) Patent No.: US 12,535,536 B2
(45) Date of Patent: Jan. 27, 2026

(54) METHOD FOR TESTING POWER LEAKAGE OF CIRCUIT AND PROCESSING SYSTEM USING SAME

(71) Applicant: REALTEK SEMICONDUCTOR CORP., Hsinchu (TW)

(72) Inventors: Meng-Jung Lee, Hsinchu (TW); Yu-Lan Lo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 719 days.

(21) Appl. No.: 17/903,370

(22) Filed: Sep. 6, 2022

(65) Prior Publication Data

US 2023/0075145 A1     Mar. 9, 2023

(30) Foreign Application Priority Data

Sep. 7, 2021   (TW) .................. 110133292

(51) Int. Cl.
  *G06F 30/30*      (2020.01)
  *G01R 31/317*     (2006.01)
  *G01R 31/3185*    (2006.01)
  *G01R 31/52*      (2020.01)
  *G06F 119/06*     (2020.01)

(52) U.S. Cl.
  CPC ....... *G01R 31/52* (2020.01); *G01R 31/31721* (2013.01); *G01R 31/318575* (2013.01); *G06F 30/30* (2020.01); *G06F 2119/06* (2020.01)

(58) Field of Classification Search
  None
  See application file for complete search history.

(56) References Cited

U.S. PATENT DOCUMENTS

| | | | |
|---|---|---|---|
| 8,504,968 B2* | 8/2013 | Newcomb | G06F 30/367 716/120 |
| 10,853,543 B1* | 12/2020 | Newcomb | G06F 30/327 |
| 10,878,149 B1* | 12/2020 | Newcomb | G06F 30/367 |
| 11,233,046 B1* | 1/2022 | Newcomb | G06F 30/323 |
| 2008/0092092 A1* | 4/2008 | Dalton | G06F 30/33 716/108 |

FOREIGN PATENT DOCUMENTS

TW    201241653 A1    10/2012

* cited by examiner

*Primary Examiner* — Leigh M Garbowski
(74) *Attorney, Agent, or Firm* — Birch, Stewart, Kolasch & Birch, LLP (57) ABSTRACT

A processing system is adapted to execute a method for testing power leakage of a circuit. The method includes: obtaining a plurality of undefined nets according to a netlist and power mode information; obtaining a trace path according to the undefined nets and the power mode information; and determining whether there is a risk of power leakage in the trace path, and outputting a testing result.

8 Claims, 11 Drawing Sheets

Power mode information 114

| Power mode | Power domain | Domain mode | |
|---|---|---|---|
| Mode_1 | First power domain | Power-off mode | Off mode |
| | Second power domain | Power-on mode | Low power mode |
| | Third power domain | Power-on mode | Power on mode |
| Mode_2 | First power domain | Power-off mode | Off mode |
| | Second power domain | Power-off mode | Off mode |
| | Third power domain | Power-on mode | Deep sleep mode |

METHOD FOR TESTING POWER LEAKAGE OF CIRCUIT AND PROCESSING SYSTEM USING SAME

CROSS-REFERENCE TO RELATED APPLICATION

This non-provisional application claims priority under 35 U.S.C. § 119(a) to Patent Application No. 110133292 filed in Taiwan, R.O.C. on Sep. 7, 2021, the entire contents of which are hereby incorporated by reference.

BACKGROUND

Technical Field

The present invention relates to a processing method and system for a circuit, and in particular, to a method for testing power leakage of a circuit and a processing system using same.

Related Art

Current integrated circuit is designed by means of function division. Each functional block has its own parameters such as frequencies and operating voltages. An independent functional block is referred to as a power domain. In order to reduce the overall power consumption, the power domain without a working configuration may enter a sleep mode, reduce the frequency, or the like.

In general, it is necessary to add an isolate cell to two power domains in a circuit design of the power domain, so as to ensure that the power domains in different operating states will not interfere with each other. If no isolate cell is disposed between the two power domains, a leakage current of the power domain or triggering of false signals may be generated. In the process of circuit design, the testing of the isolate cell requires a lot of operation costs.

SUMMARY

In view of this, according to some embodiments, a method for testing power leakage of a circuit is provided, to detect whether there is a risk of power leakage between power domains of the circuit when the circuit is in a specific power mode. If there is a risk of power leakage, a relevant prompt about a risk of power leakage is outputted, to ensure that each power domain will not interfere with other power domains and reduce the operation costs of circuit testing.

In some embodiments, the method for testing power leakage of a circuit includes: obtaining a plurality of undefined nets according to a netlist and power mode information, where the power mode information includes a plurality of power modes, a plurality of power domains, and a plurality of domain modes; in each power mode, each power domain corresponds to one domain mode; the domain mode is a power-off mode or a power-on mode, the power domains corresponding to the domain modes include a power-on domain and a power-off domain, and each undefined net is a circuit connecting line across two power domains; obtaining a plurality of trace paths according to one of the undefined nets and the power modes, where each trace path is connected to the power-on domain and the power-off domain; and determining whether there is a risk of power leakage in the each trace path and the power-on domain connected to the each trace path, and outputting a testing result. The method for testing power leakage of a circuit may not include monitoring an input signal or disposing a separation cell. Therefore, the overall testing simulation duration can be shortened.

In some embodiments, the power-on domain includes a connecting cell, the connecting cell is connected to the each trace path, and the step of determining whether there is a risk of power leakage in the power-on domain includes: determining whether an end point of the connecting cell that is connected to the trace path is a gate of a field effect transistor (FET), where if a determining result is yes, the testing result is that power leakage occurs; and if the determining result is no, the testing result is that no power leakage occurs.

In some embodiments, after the step of outputting the testing result, the method includes: performing switching between the power domains and the domain modes of the power domains according to the power mode information.

In some embodiments, a processing system using the method for testing power leakage includes a storage cell and a processor. The storage cell is configured to store the method for testing power leakage, the testing result, the power mode information, and the netlist. The processor is configured to execute the method for testing power leakage.

In some embodiments, the power-on domain includes a connecting cell, and the connecting cell is connected to the trace path.

In some embodiments, the processor is configured to determine whether an end point of the connecting cell that is connected to the trace path is a gate of the FET. If a result is yes, the testing result is that power leakage occurs. If the determining result is no, the testing result is that no power leakage occurs.

In some embodiments, the method for testing power leakage of a circuit and the processing system using same are used to detect whether there is a possibility of power leakage between the power domains of the circuit in different power modes, and generate a prompt about a corresponding position, so that the circuit designer can add a blocking cell to the corresponding position. The method for testing power leakage of a circuit of the present invention is the use of independent software or a combination with current circuit software by using a plug-in kit.

DETAILED DESCRIPTION

Figure 1:
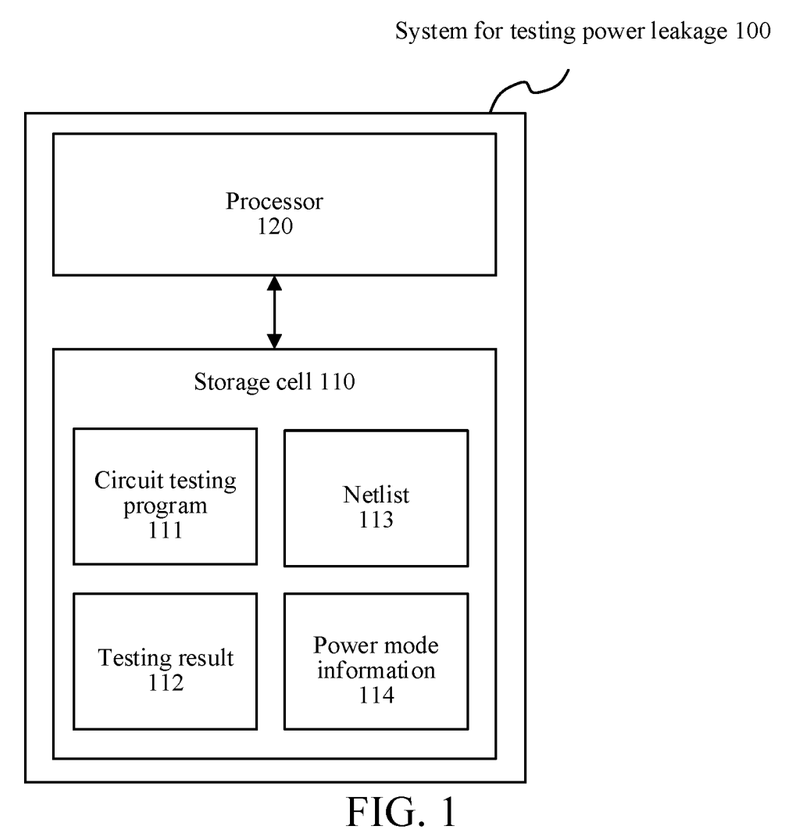
FIG. 1 is a schematic diagram of a system architecture according to an embodiment.

FIG. 1 is a schematic diagram of a system architecture according to an embodiment. In some embodiments, the system 100 for testing power leakage of a circuit includes a storage cell 110 and a processor 120. The processor 120 is electrically coupled to the storage cell 110. The storage cell 110 stores a circuit testing program 111, a testing result 112, a netlist 113, and power mode information 114.

Figure 2:
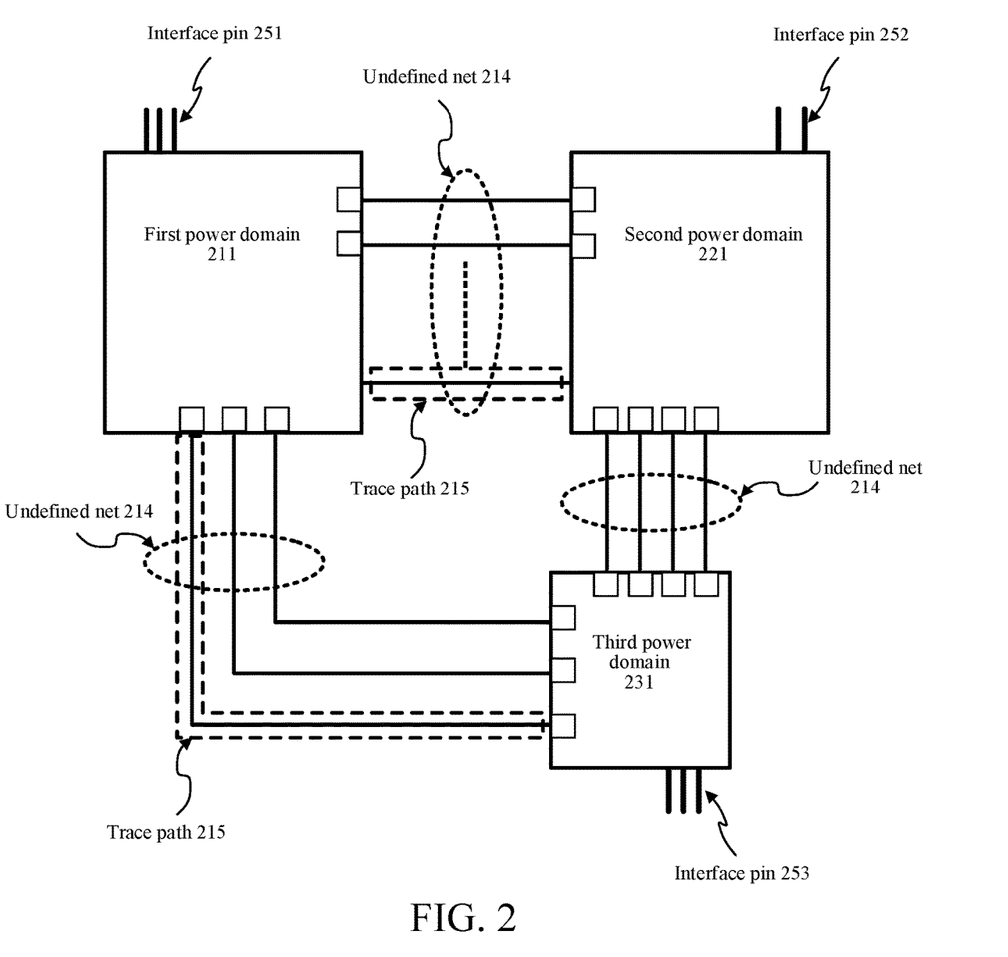
FIG. 2 is a schematic diagram of a power domain, an undefined net, and a trace path according to an embodiment.
Figure 5A:
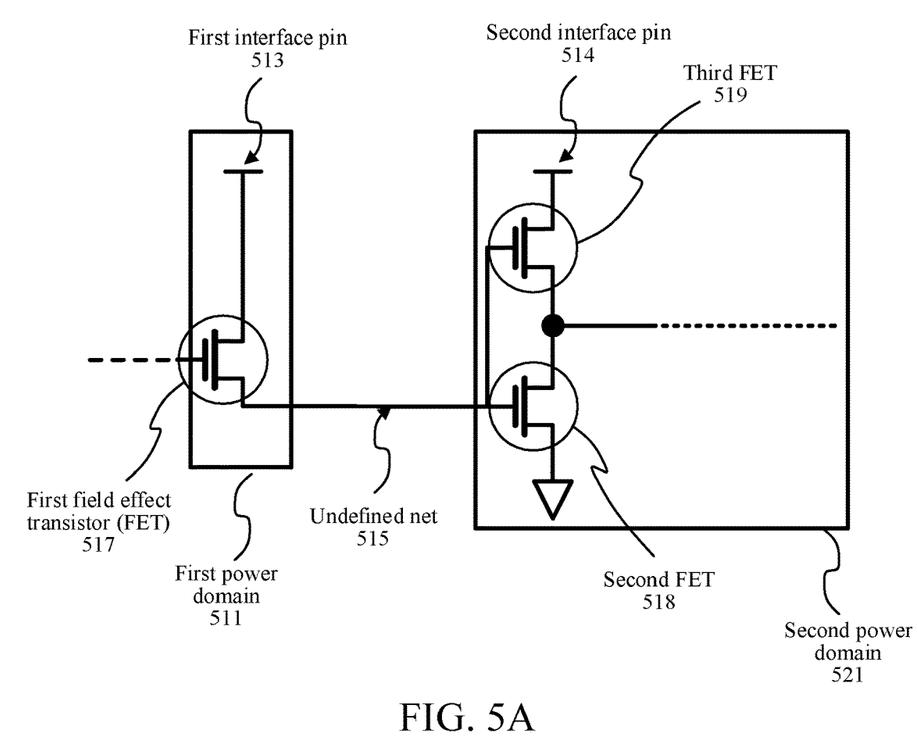
FIG. 5A is a schematic diagram of an undefined net between a first power domain and a second power domain according to an embodiment.
Figure 5B:
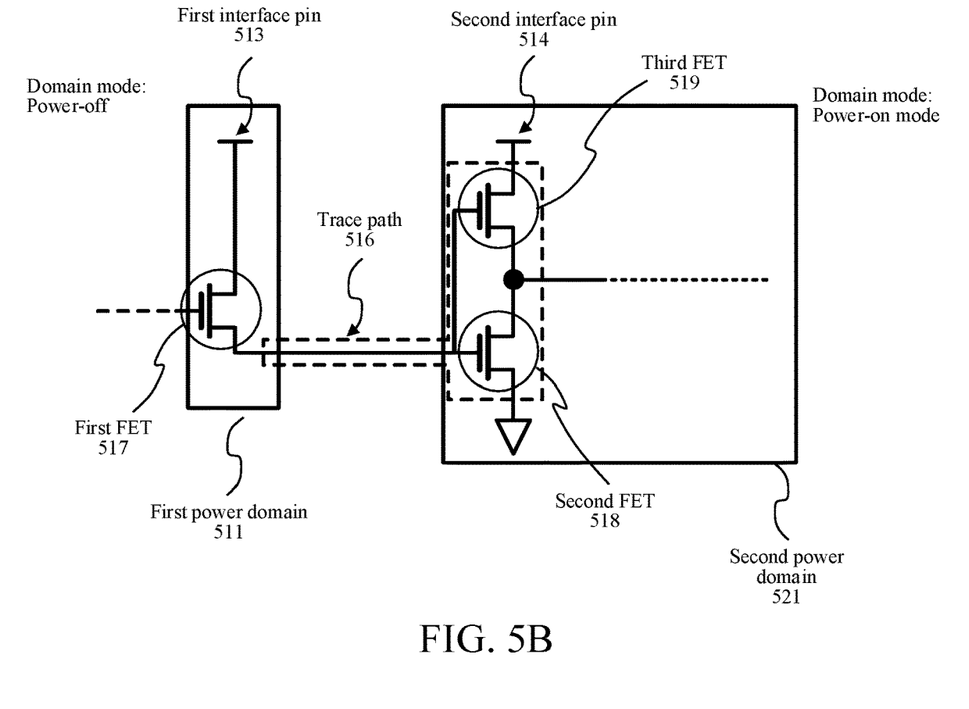
FIG. 5B is a schematic diagram of a trace path between a first power domain and a second power domain according to an embodiment.
Figure 7A:
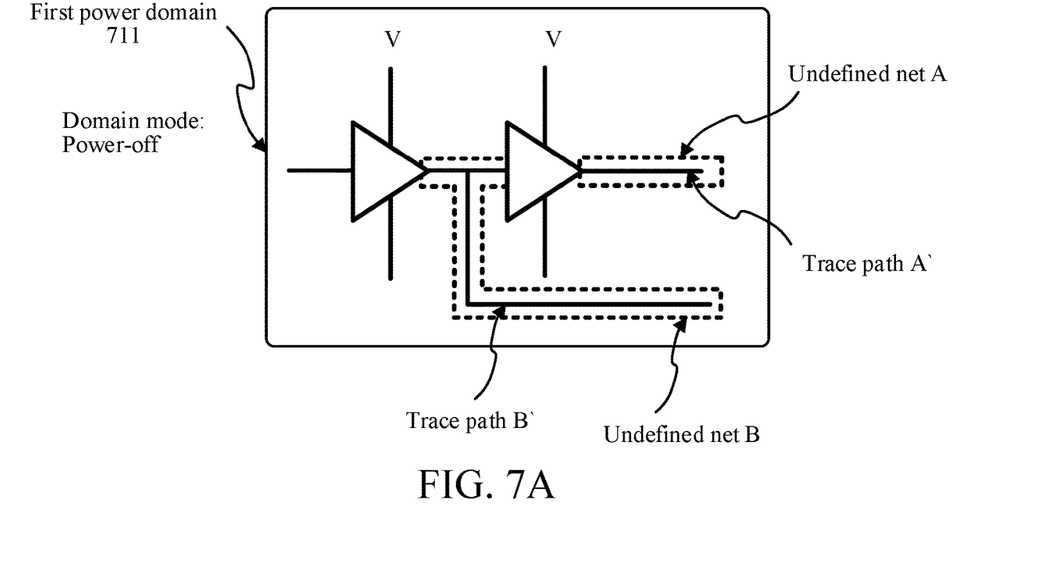
FIG. 7A is a schematic diagram of a domain mode, an undefined net, and a trace path of a first power domain according to an embodiment.

The netlist 113 includes a plurality of electronic cells (unlabeled, refer to examples in FIG. 5A, FIG. 5B, FIG. 7A. FIG. 7B, FIG. 7C, FIG. 8A, and FIG. 8B), a circuit structure (unlabeled, refer to examples in FIG. 5A, FIG. 5B, FIG. 7A. FIG. 7B, FIG. 7C, FIG. 8A, and FIG. 8B), interface pins, power domains, and the like, as shown in FIG. 2. The netlist 113 is shown graphically in FIG. 2. In fact, the netlist 113 may be a data table or a text file. Each power domain includes a plurality of interface pins (251, 252, 253), a plurality of electronic cells (unlabeled), and a circuit structure (unlabeled). Squares in FIG. 2 represent power domains of the netlist 113. The power domains are respectively a first power domain 211, a second power domain 221, and a third power domain 231. A plurality of interface pins 251 are disposed on the first power domain 211, a plurality of interface pins 252 are disposed on the second power domain 221, and a plurality of interface pins 253 are disposed on the third power domain 231. The interface pins (251, 252, 253) are used for setting the domain mode of each power domain (211, 221, 231). The circuit structure is a combination of electronic cells (a layout including the electronic cells or a coupling combination of electronic cells).

At least one undefined net 214 is disposed between two power domains. In FIG. 2, the undefined net 214 of each power domain is circled by using a dashed oval frame having a relatively small spacing. The undefined net 214 may be a circuit coupled to two power domains, or may be composed of a plurality of electronic cells. During the power leakage testing, the processor 120 tests each set of undefined nets 214. The undefined net 214 selected and tested by the processor 120 is referred to as a trace path 215. In FIG. 2, the undefined net 214 circled by a dashed frame having a relatively large spacing is the trace path 215. The trace path 215 is represented in the same way in other figures below.

Figure 3:
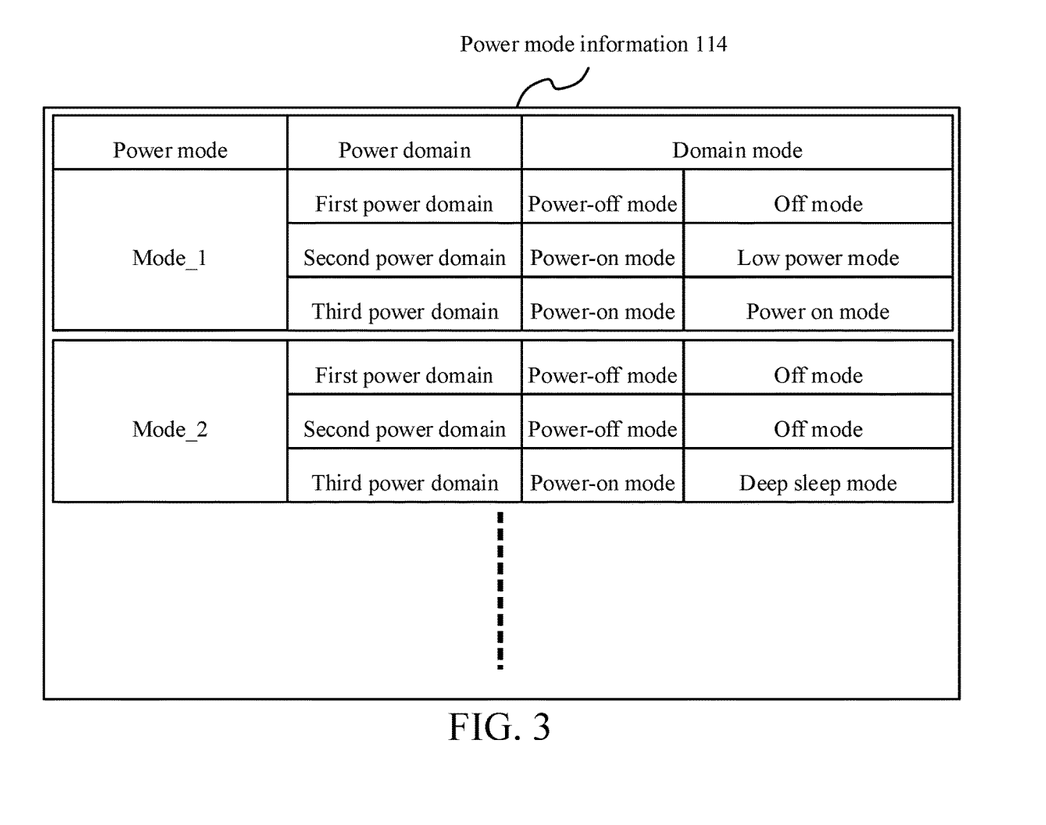
FIG. 3 is a schematic diagram of power mode information according to an embodiment.

Referring to FIG. 3, the power mode information 114 includes a plurality of power modes, a plurality of power domains, and a plurality of domain modes. The power mode is used for recording a current domain mode of each power domain. In the same power mode, each power domain has its own corresponding domain mode. The domain mode includes a power-off mode or a power-on mode. The processor 120 switches the power mode to cause the each power domain to be in a corresponding domain mode.

When the domain mode is a power down mode, the power domain has no operating power. In addition to the power during normal operation, the power-on mode further includes operating power in a plurality of different modes. In some embodiments, the power-on mode is, for example, a low power mode, a deep sleep mode, or a power-on mode. In order to facilitate the description of the power domains in different domain modes, the power domains are further divided into a power-on domain and a power-off domain. The power-on domain is the power domain in the power-on mode, and the power-off domain is the power domain in the power-off mode.

Figure 4:
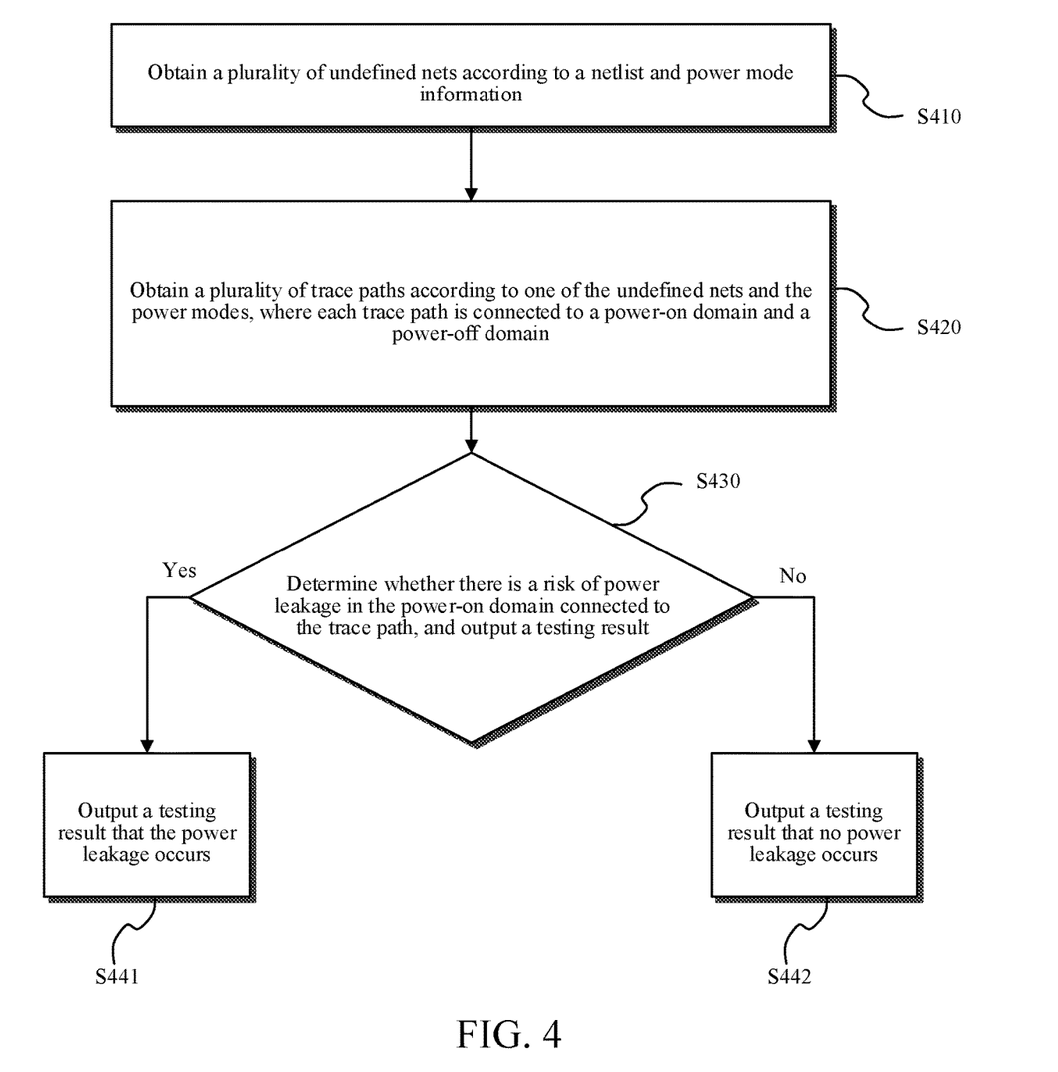
FIG. 4 is a schematic flowchart of circuit testing operation according to an embodiment.

The processor 120 executes the circuit testing program 111. The circuit testing program 111 is a computer program for executing a method for testing power leakage. The method for testing power leakage is used for testing whether there is a risk of power leakage in any two power domains of the above netlist 113. The circuit testing program 111 may be software that executes the method for testing power leakage in a computer programming language, or may be a combination of a plug-in program and current circuit design software. The circuit testing program 111 switches each power domain to be in a different domain mode according to the power mode information 114, and tests whether there is a risk of power leakage in each trace path 215 of the undefined net 214. In order to clearly describe the operation of this embodiment, FIG. 4 is a schematic flowchart of power leakage testing of a circuit according to an embodiment. A method for testing power leakage of a circuit includes the following steps.

Step S410: Obtain a plurality of undefined nets according to a netlist and power mode information.

Step S420: Obtain a plurality of trace paths according to one of the undefined nets and the power modes, where each trace path is connected to a power-on domain and a power-off domain.

Step S430: Determine whether there is a risk of power leakage in the each trace path and the power-on domain connected to the each trace path, and output a testing result.

Step S441: If there is a risk of power leakage in the trace path, output a testing result that the power leakage occurs.

Step S442: If there is no risk of power leakage in the trace path, output the testing result that no power leakage occurs.

First, the circuit testing program 111 loads the netlist 113 from the storage cell 110. The circuit testing program 111 obtains at least two power domains according to the netlist 113. In this embodiment, two power domains are used for description. The two power domains are respectively a first power domain 511 and a second power domain 521, as shown in FIG. 5A. The first power domain 511 has a plurality of electronic cells and a first interface pin 513. FIG. 5A and FIG. 5B only show some cells connected to the first power domain 511 and the second power domain 521, and other electronic cells that are not directly connected to the first power domain and the second power domain are not listed one by one.

The second power domain 521 has a plurality of electronic cells and a second interface pin 514. Similarly, although only the electronic cells connected to the undefined net are drawn in the second power domain 521, the electronic cells are not limited in the present invention. An undefined net 515 is provided between the first power domain 511 and the second power domain 521. In order to distinguish between the electronic cells connected to the trace path and other electronic cells in each power domain, the electronic cells directly connected to the trace path are referred to as connecting cells.

Next, the circuit testing program 111 loads the power mode information 114, sets a domain mode of the first power domain 511 by using the first interface pin 513, and sets a domain mode of the second power domain 521 by using the second interface pin 514. Referring to FIG. 5B, the first power domain 511 is a power-off domain, and the second power domain 521 is a power-on domain. Assuming that only a set of undefined nets 515 is provided between the first power domain 511 and the second power domain 521, the undefined net 515 is also the trace path 516. For the trace path 516, refer to the dashed block in FIG. 5B. As described above, FETs 517 and 518 in the trace path of FIG. 5A are connecting cells.

In one embodiment, the circuit testing program 111 determines, according to the domain modes of the two power domains 511 and 521, whether there is a risk of power leakage in the trace path 516. If the domain modes of the two power domains 511 and 521 connected to the trace path 516 are the same, the circuit testing program 111 may directly determine that there is no risk of power leakage in the trace path 516. Therefore, the circuit testing program 111 outputs the testing result 112 that no power leakage occurs. If the first power domain 511 is a power-off domain and the second power domain 521 is a power-on domain, the circuit testing program 111 determines that there is a risk of power leakage in the trace path 516.

Figure 6:
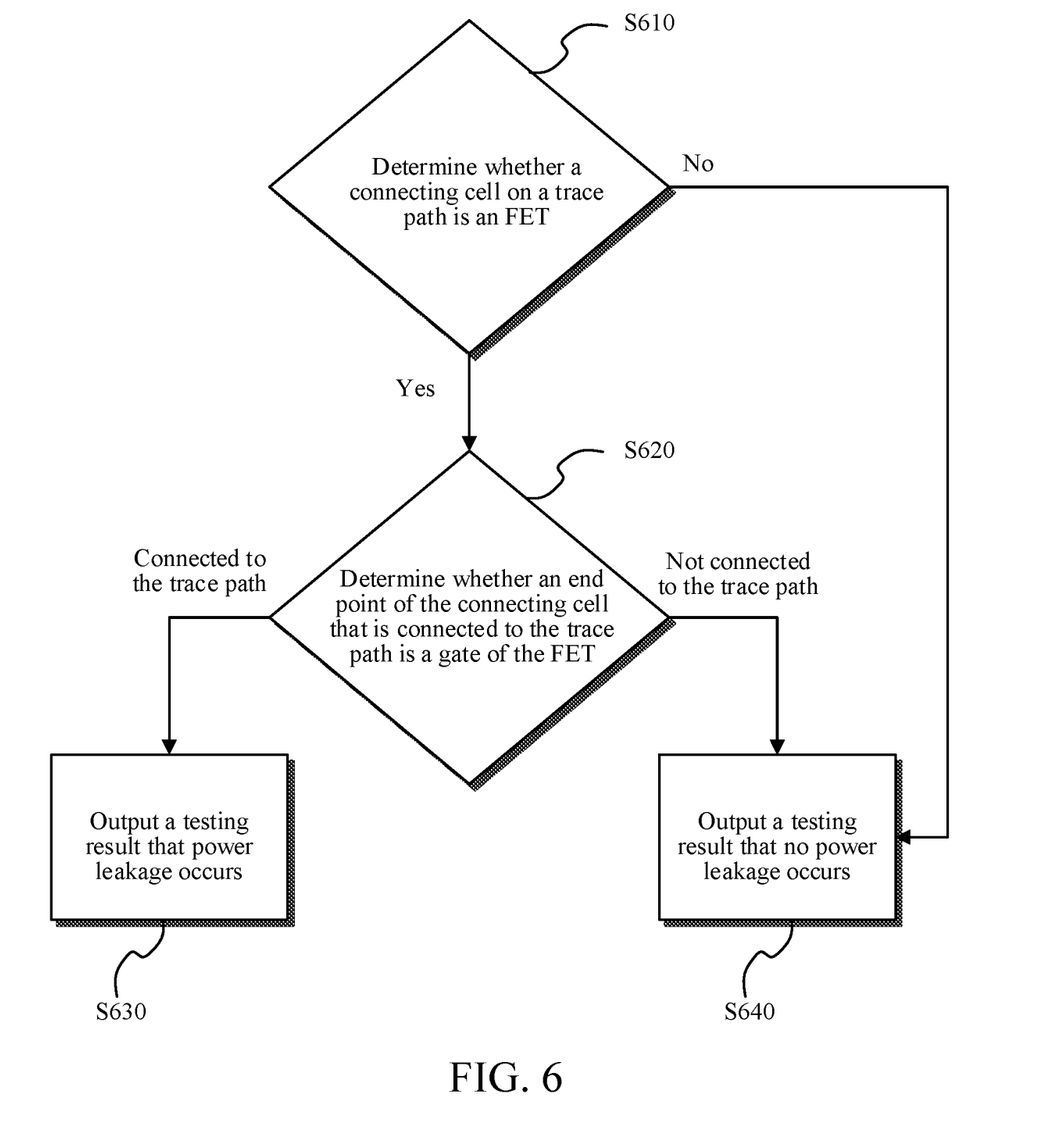
FIG. 6 is a schematic diagram of power leakage testing according to an embodiment.

In one embodiment, the circuit testing program 111 determines, based on the trace path and the connecting cells, whether there is a risk of power leakage. Referring to FIG. 6, the circuit testing program 111 determines, according to the following steps, whether there is a risk of power leakage in the trace path 516.

Step S610: Determine whether a connecting cell on the trace path is an FET.

Step S620: Determine whether an end point of the connecting cell that is connected to the trace path is a gate of the FET.

Step S630: If the gate of the FET is connected to the trace path, a testing result is that power leakage occurs.

Step S640: If the gate of the FET is not connected to the trace path, the testing result is that no power leakage occurs.

Herein, FIG. 5A and FIG. 5B are still used as examples for description. The first power domain 511 includes at least one first field-effect transistor (MOSFET) 517. As shown in FIG. 5A, the second power domain 521 includes a second FET 518 and a third FET 519. A gate of the second FET 518 is connected to a gate of the third FET 519, and a source of the second FET 518 is connected to a drain of the third FET 519. As shown in FIG. 5A, one end of the trace path 516 is connected to a source of the first FET 517, and the other end of the trace path 516 is connected to the gate of the second FET 518.

The circuit testing program 111 traverses the trace path 516 to test whether there is an FET. If there is an FET on the trace path 516, the circuit testing program 111 further determines whether the gate of the FET is connected to the trace path 516. If the gate of the FET is connected to the trace path 516, the circuit testing program 111 outputs the testing result 112 that the power leakage occurs. If the connecting cell is not an FET, the circuit testing program 111 outputs the testing result 112 that no power leakage occurs. If the connecting cell is an FET, but the gate of the FET is not connected to the trace path 516, the circuit testing program 111 also outputs the testing result 112 that no power leakage occurs.

In one embodiment, the circuit testing program 111 determines, according to the power domain connected to the gate of the FET and the domain mode, whether there is a risk of power leakage. First, the circuit testing program 111 determines whether the FET exists on the trace path 516. If an FET exists on the trace path 516, the circuit testing program 111 determines the domain mode of the second power domain 521 connected to the gate of the FET. If the domain mode of the second power domain 521 is a power-on mode, the circuit testing program 111 determines that there is a risk of power leakage in the trace path 516, and outputs the testing result 112 that the power leakage occurs.

Figure 7B:
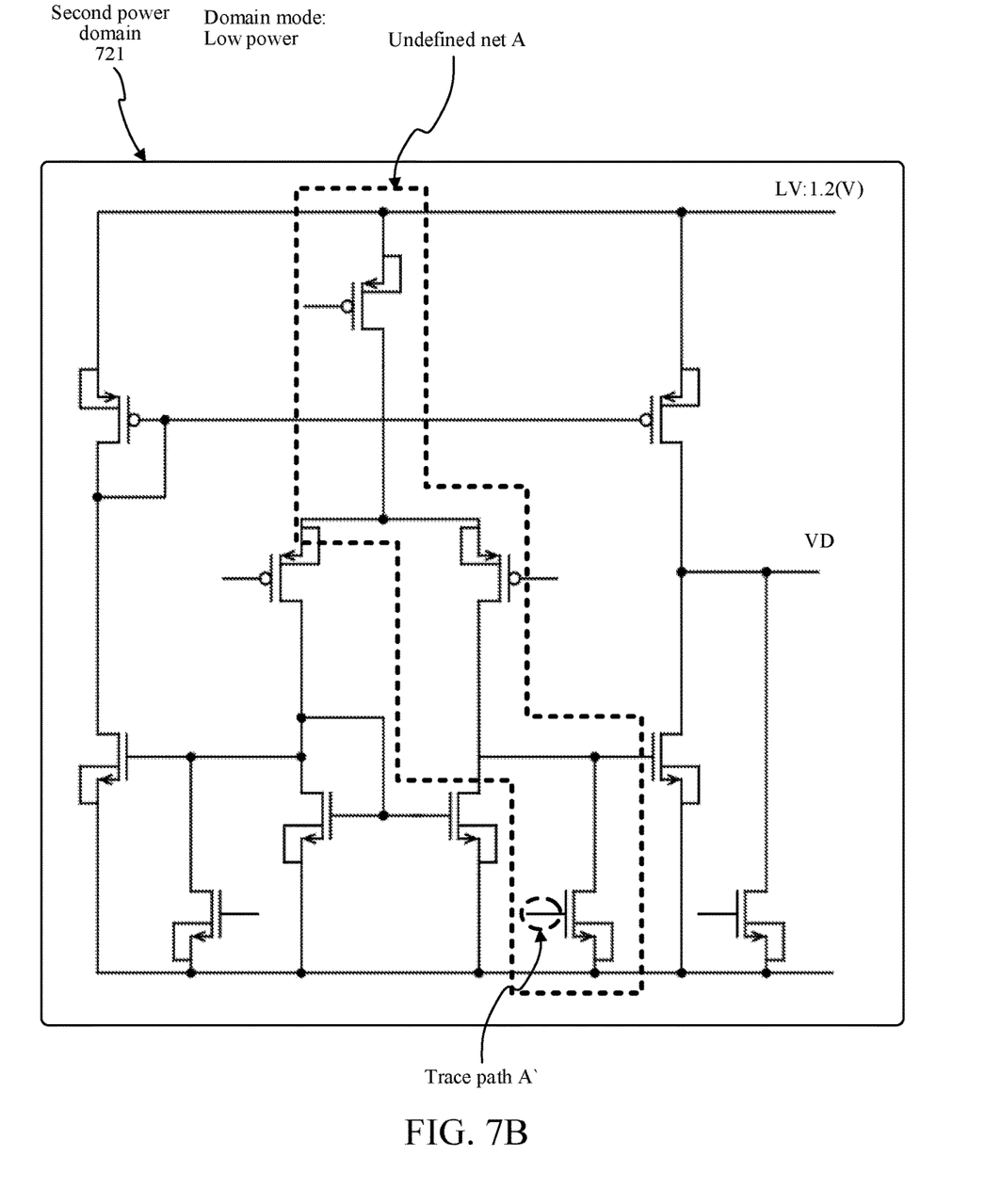
FIG. 7B is a schematic diagram of a domain mode, an undefined net, and a trace path of a second power domain according to an embodiment.
Figure 7C:
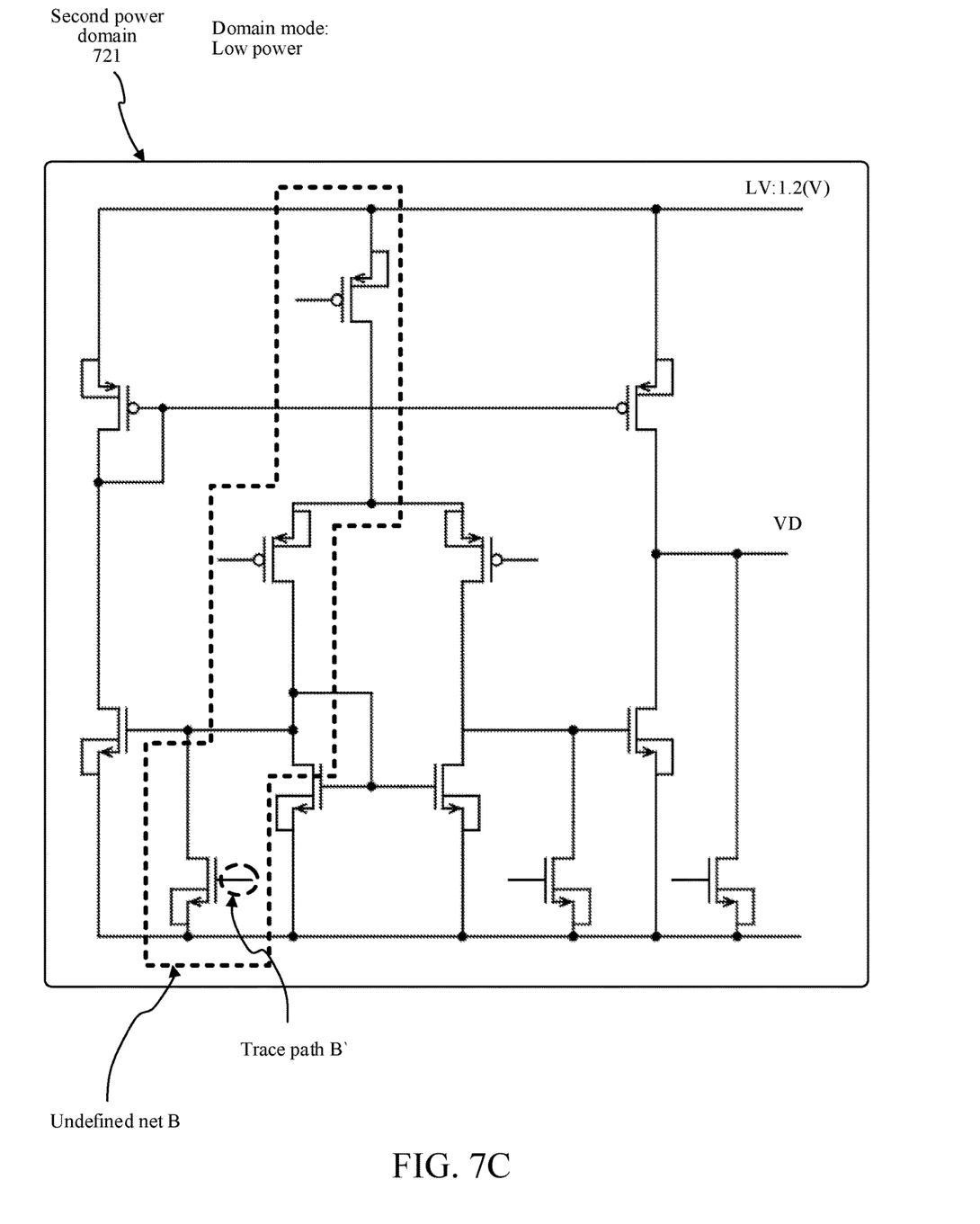
FIG. 7C is a schematic diagram a domain mode, another undefined net, and another trace path of a second power domain according to an embodiment.
Figure 8A:
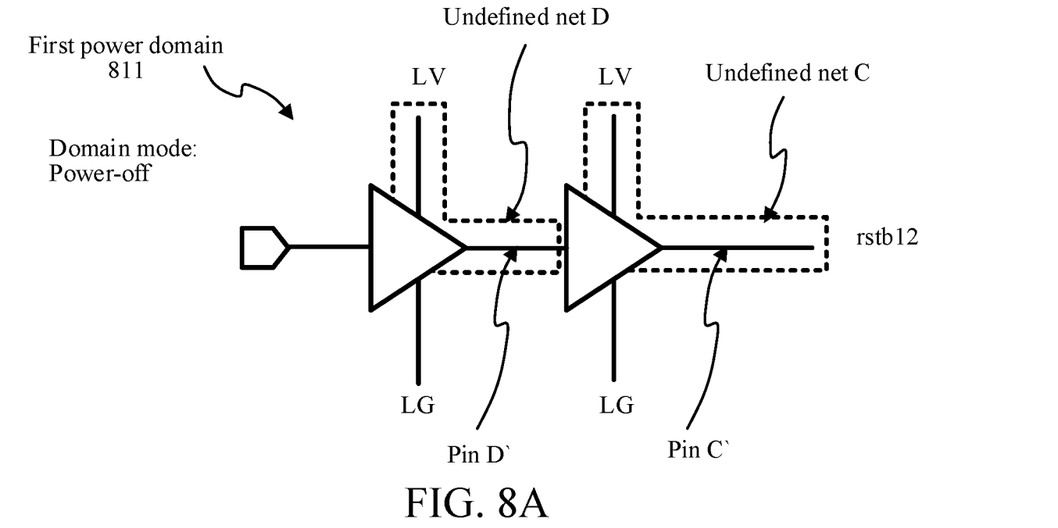
FIG. 8A is a schematic diagram of a domain mode, an undefined net, and a trace path of a first power domain according to an embodiment.
Figure 8B:
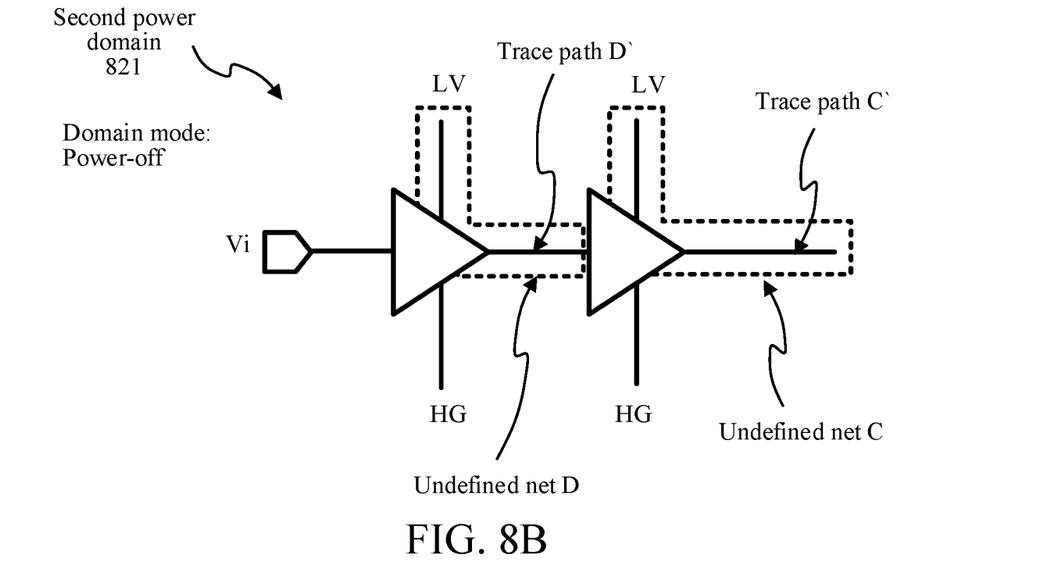
FIG. 8B is a schematic diagram of a domain mode, an undefined net, and a trace path of a second power domain according to an embodiment.
Figure 8C:
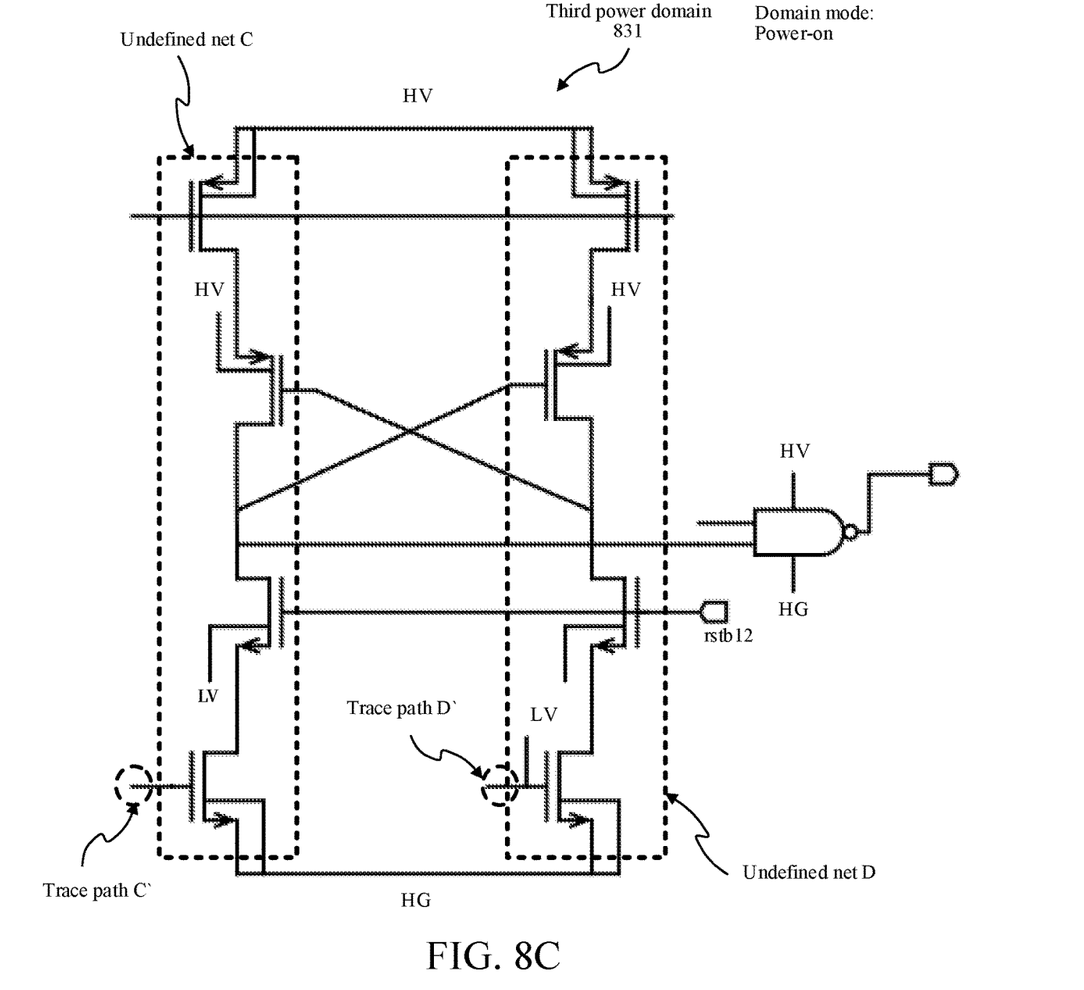
FIG. 8C is a schematic diagram of a domain mode, an undefined net, and a trace path of a third power domain according to an embodiment.

FIG. 7A, FIG. 7B, FIG. 7C, FIG. 8A, FIG. 8B, and FIG. 8C respectively represent different netlists 113 and corresponding power domains. Two power domains 711 and 721 are respectively provided in FIG. 7A and FIG. 7B. The two power domains are respectively a first power domain 711 and a second power domain 721. FIG. 7A represents the first power domain 711, and FIG. 7B represents the second power domain 721. In order to facilitate the description of the undefined net of each power domain, pin names of the electronic cells in FIG. 7A, FIG. 7B, FIG. 8A, FIG. 8B, and FIG. 8C are used as names of the corresponding undefined nets and trace paths. For example, an undefined net A means a circuit between a pin A of the first power domain 711 and a pin A of the second power domain 721 (as shown in FIG. 7A, FIG. 7B and FIG. 7C). An undefined net C means a circuit between a trace path C' of a second power domain 821 and a trace path C' of a third power domain 831 (as shown in FIG. 8A, FIG. 8B, and FIG. 8C).

Two undefined nets are provided on the first power domain 711 to be connected to the second power domain 721, and the two undefined nets are an undefined net A and an undefined net B respectively. The circuit testing program 111 sets the domain mode of the first power domain 711 to an off mode according to the power mode information 114, so that the first power domain 711 is set as a power-off domain. The circuit testing program 111 sets the domain mode of the second power domain 721 to a low power mode, so that the second power domain 721 is set as a power-on domain.

It is assumed that circuit testing program 111 first selects the undefined net A as the trace path A', but the sequence is not limited thereto. The circuit testing program 111 may determine an order of selecting the trace paths A' and B' according to other factors, such as a quantity of electronic cells, a result of static analysis of a circuit, or the like. It can be learned from FIG. 7A, FIG. 7B, and FIG. 7C that a plurality of electronic cells exist on the trace path A'. The electronic cells include an operational amplifier and an FET. Assuming that there are three FETs on the trace path A' in the second power domain 721, a gate of a to-be-tested FET (circled by the dashed frame) is connected to an output terminal of the operational amplifier of the first power domain 711. Since the domain modes of the first power domain 711 and the second power domain 721 are different, the circuit testing program 111 determines that there is a risk of power leakage in the set of trace paths A'. Upon completion of the trace path A', the circuit testing program 111 outputs the testing result 112 that there is a risk of power leakage.

Next, as shown in FIG. 7C, the circuit testing program 111 selects the undefined net B, and tests whether there is a risk of power leakage in the trace path B'. The circuit testing program 111 outputs the testing result 112 according to the trace path B', the domain mode of the first power domain 711, and the domain mode of the second power domain 721. Since the domain mode of the first power domain 711 is different from the domain mode of the second power domain 721, the circuit testing program 111 determines that there is a risk of power leakage in the trace path B', and therefore will output the testing result 112 that there is a risk of power leakage. The above power leakage testing can be performed for other trace paths and the FETs to which the trace paths belong in FIG. 7B or FIG. 7C.

FIG. 8A, FIG. 8B, and FIG. 8C respectively represent three power domains 811, 821, and 831. FIG. 8A represents a first power domain 811, FIG. 8B represents a second power domain 821, and FIG. 8C represents a third power domain 831. The circuit testing program 111 sets the domain mode of each power domain 811, 821, and 831 to the following modes according to the power mode information 114. The domain modes of the first power domain 811 and the second power domain 821 are both an off mode, and the domain mode of the third power domain 831 is a power-on mode. The third power domain 831 is respectively coupled to the first power domain 811 and the second power domain 821. A pin LV and a pin rstb12 of the first power domain 811 are both connected to corresponding pins of the third power domain 831. Similarly, a pin LV, a pin C', and a pin D' of the second power domain 821 are all connected to the corresponding pins of the third power domain 831.

Taking the undefined net C as an example, the circuit testing program 111 selects the undefined net C, uses the pin C' as the trace path C', and tests whether there is a risk of power leakage in the trace path C'. The trace path C' in the second power domain 821 is connected to an output terminal of an inverter, and an other end of the trace path C' is connected to the FET of the third power domain 831. First, the circuit testing program 111 checks a pin of the trace path C' connected to the FET. Since the trace path C' is connected to the gate of the FET, and the domain mode of the third power domain 831 is a power-on mode, the circuit testing program 111 determines that there is a risk of power leakage in the trace path C', and generates the testing result 112 that there is a risk of power leakage.

Next, the circuit testing program 111 continuously tests other undefined nets between the second power domain 821 and the third power domain 831 until all undefined nets are completed, for example, an undefined net D and a trace path D'. The circuit testing program 111 performs switched testing between the first power domain 811 and the second power domain 821, or power leakage testing of the first power domain 811 and the third power domain 831.

In some embodiments, the method for testing power leakage of a circuit and the processing system are used to detect whether there is a risk of power leakage between the power domains in a specific power mode, and generate a corresponding position prompt, so that the circuit designer can add a blocking cell to the corresponding position. The system 100 for testing power leakage of a circuit of the present invention is independent software, or a combination with current circuit software by using a plug-in kit. During the testing, the circuit testing program 111 does not need to additionally calculate the input signals of the electronic cells, thereby reducing the operation costs of checking and improving the checking efficiency.

What is claimed is:

1. A method for testing power leakage of a circuit, the method comprising:
obtaining a plurality of undefined nets according to a netlist and power mode information, wherein the power mode information comprises a plurality of power modes, a plurality of power domains, and a plurality of domain modes; in each power mode, each power domain corresponds to one domain mode; the domain mode is a power-off mode or a power-on mode, the power domains corresponding to the domain modes comprise a power-on domain and a power-off domain, and each undefined net is a circuit connecting line across two power domains;
obtaining a plurality of trace paths according to one of the undefined nets and the power modes, wherein each trace path is connected to the power-on domain and the power-off domain; and
determining whether there is a risk of power leakage in the each trace path and the power-on domain connected to the each trace path, and outputting a testing result.

2. The method for testing power leakage of a circuit according to claim 1, wherein the power-on mode comprises a low power mode, a deep sleep mode, or a power-on mode.

3. The method for testing power leakage of a circuit according to claim 1, wherein the power-on domain comprises a connecting cell, the connecting cell is connected to the each trace path, and the step of determining whether there is a risk of power leakage in the power-on domain comprises:
determining whether an end point of the connecting cell that is connected to the trace path is a gate of a field effect transistor (FET), wherein
if a determining result is yes, the testing result is that the power leakage occurs; and
if the determining result is no, the testing result is that no power leakage occurs.

4. The method for testing power leakage of a circuit according to claim 1, wherein after the step of outputting the testing result, the method comprises: performing switching between the power domains and the domain modes of the power domains according to the power mode information.

5. The method for testing power leakage of a circuit according to claim 4, wherein it is tested whether there is a risk of power leakage in the power domains and the corresponding trace path after the switching.

6. A processing system using the method for testing power leakage according to claim 1, the processing system comprising:
a storage cell, configured to store the method for testing power leakage, the testing result, the power mode information, and the netlist; and
a processor, configured to execute the method for testing power leakage.

7. The processing system using the method for testing power leakage according to claim 6, wherein the power-on domain comprises a connecting cell, and the connecting cell is connected to the trace path.

8. The processing system using the method for testing power leakage according to claim 6, wherein the processor is configured to determine whether an end point of the connecting cell that is connected to the trace path is a gate of an FET, wherein if a determining result is yes, the testing result is that the power leakage occurs; if the determining result is no, the testing result is that no power leakage occurs.

* * * * *